United States Patent [19]

Stein

[11] 3,819,853

[45] June 25, 1974

[54] SYSTEM FOR SYNCHRONOUS DATA TRANSMISSION THROUGH A DIGITAL TRANSMISSION CHANNEL

[75] Inventor: Michel Guy Pierre Stein, Bazoches Sur Guyenne (Yveslines), France

[73] Assignee: Telecommunications Radioelectriques Et Telephoniques T.R.T., Paris, France

[22] Filed: Nov. 6, 1972

[21] Appl. No.: 303,978

[30] Foreign Application Priority Data

Nov. 18, 1971 France .............................. 7141258

[52] U.S. Cl. ................ 178/68, 178/69.5 R, 328/63, 328/72

[51] Int. Cl. ............................................. H04l 7/00

[58] Field of Search ...... 325/58, 143, 164, 321–325, 325/38 R; 328/63, 72, 155; 178/69.5 R, 50, 178/68; 179/15 BS, 15 BV, 15 A

[56] References Cited

UNITED STATES PATENTS

| | | | |
|---|---|---|---|
| 3,309,463 | 3/1967 | Roedl | 325/325 X |
| 3,440,548 | 4/1969 | Saltzberg | 328/63 X |
| 3,564,414 | 2/1971 | Ebert | 325/38 R |
| 3,564,425 | 2/1971 | Brok | 178/69.5 R X |
| 3,627,946 | 12/1971 | Inoue et al. | 325/321 |

*Primary Examiner*—Howard W. Britton
*Assistant Examiner*—Aristotelis M. Psitos
*Attorney, Agent, or Firm*—Frank R. Trifari; Simon L. Cohen

[57] ABSTRACT

A system for synchronous data transmission through a digital transmission channel whose transmission clock is independent of the data clock. The data signal to be transmitted is sampled at the transmitting terminal with the transmission clock and the data signal is recovered at the receiving terminal from the received digital signal of the transmission channel by sampling this signal by means of a regenerated local data clock which is synchronized with the mean phase position of the transitions in the received digital signal. As a result both a high transmission efficiency and a low distortion of the recovered data signal is obtained.

1 Claim, 4 Drawing Figures

| r=(t/T) | n | $P=10^{-4}$ | | $P=10^{-5}$ | | $P=10^{-6}$ | |
|---|---|---|---|---|---|---|---|
| | | $P_d$ | $P_e$ | $P_d$ | $P_e$ | $P_d$ | $P_e$ |
| 62% | 256 | $\varepsilon$ | $\varepsilon$ | $\varepsilon$ | $\varepsilon$ | $\varepsilon$ | $\varepsilon$ |
| | 512 | $\varepsilon$ | $\varepsilon$ | $\varepsilon$ | $\varepsilon$ | $\varepsilon$ | $\varepsilon$ |
| | 1024 | $(1,2)10^{-6}$ | $\varepsilon$ | $\varepsilon$ | $\varepsilon$ | $\varepsilon$ | $\varepsilon$ |
| 71% | 256 | $(4)10^{-5}$ | $(1,1)10^{-7}$ | $(1,4)10^{-7}$ | $\varepsilon$ | $(9,7)10^{-8}$ | $\varepsilon$ |
| | 512 | $(1,5)10^{-4}$ | $(3,8)10^{-7}$ | $\varepsilon$ | $\varepsilon$ | $\varepsilon$ | $\varepsilon$ |
| | 1024 | — | — | $\varepsilon$ | $\varepsilon$ | $\varepsilon$ | $\varepsilon$ |
| 78% | 256 | $(6,5)10^{-3}$ | $(2,9)10^{-5}$ | $(1)10^{-4}$ | $(3)10^{-7}$ | $(8,8)10^{-5}$ | $(2,5)10^{-7}$ |
| | 512 | $(6)10^{-2}$ | $(2,9)10^{-4}$ | $(9,7)10^{-8}$ | $\varepsilon$ | $\varepsilon$ | $\varepsilon$ |
| | 1024 | — | — | $\varepsilon$ | $\varepsilon$ | $\varepsilon$ | $\varepsilon$ |
| 86% | 256 | $(1,9)10^{-1}$ | $(1,6)10^{-3}$ | $(1,9)10^{-2}$ | $(8,8)10^{-5}$ | $(1,8)10^{-2}$ | $(8,1)10^{-5}$ |
| | 512 | — | — | $(1,4)10^{-3}$ | $(3,8)10^{-6}$ | $(5,8)10^{-4}$ | $(1,4)10^{-6}$ |
| | 1024 | — | — | $(1,1)10^{-4}$ | $(2)10^{-7}$ | $(1,2)10^{-6}$ | $\varepsilon$ |

Fig.4

SYSTEM FOR SYNCHRONOUS DATA TRANSMISSION THROUGH A DIGITAL TRANSMISSION CHANNEL

The invention relates to a system for synchronous data transmission through a digital transmission channel arranged for digital signals having a transmission rate determined by a transmission clock, the transmitting and receiving terminals of the transmission channel being coupled with data terminals arranged for data signals having a data rate determined by a data clock that is independent of the transmission clock.

Since the transmission clock and the data clock are independent of each other, there is no relationship at all between the frequencies and the phases of the two clocks and these clocks cannot be synchronized with each other. This fact gives rise to special difficulties when using the digital transmission channel for synchronous data transmission.

For example, the digital transmission channel can no longer be used in the simple manner which is possible if the two clocks can be synchronized with each other. If the frequency of the transmission clock were equal to, for example, the frequency of the data clock or an integral multiple thereof, each data bit would be transmitted for an integral number of periods of the transmission clock at the transmitting terminal; the data clock at the receiving terminal can then be easily derived from the transmission clock by using this simple frequency relationship, and the original data signals can be recovered in a simple manner with the aid of this local data clock. Furthermore the frequency of the transmission clock must in any case be higher than that of the independent data clock because otherwise certain data bits would be lost during transmission.

Systems are known which attempt to obviate the difficulties due to the independent data and transmission clocks by using a stuffing process. According to this process stuffing bits without actual information contents are added to the data bits to be transmitted and this with a quantity which is just sufficient to adapt the data rate thus increased to the transmission rate of the digital transmission channel. This process has the advantage that an optimum efficiency is obtained therewith; this efficiency, the ratio between the data rate of the actual data bits and the transmission rate is, for example, between 0.1 and 1. On the other hand this stuffing process has the drawback of being rather intricate due to the fact that the quantity of stuffing bits is not fixed but continuously changes due to the variations of the data clock relative to the transmission clock. As a result it is necessary that information regarding their presence and location is incorporated in the stuffing bits which information makes it possible to distinguish the stuffing bits from the actual data bits at the receiving terminal in order to eliminate them and to have exclusively the data signal left. The equipment required for this stuffing process is therefore intricate and expensive.

On the other hand systems are known for asynchronous data transmission through a synchronous digital transmission channel. In these systems the asynchronous data signal to be transmitted at the transmitting terminal is sampled with the transmission clock of the synchronous transmission channel, while the original data signal is recovered from the received digital signal at the receiving terminal with the aid of the regenerated transmission clock. This very simple process of low cost has, however, the great drawback that a high efficiency and a slight distortion in the recovered data signal cannot be simultaneously obtained. In fact, if one bit in the asynchronous data signal has a duration of $m$ sec and consequently the maximum data rate of the asynchronous data signal is equal to $1/m$ bits/sec and when furthermore the frequency of the transmission clock is $1/t$, the efficiency $r$ is equal to:

$$r = (1/m):(1/t) = t/m.$$

On the other hand the distortion in the transmitted data signal is equal to the time interval between two successive samples and is consequently equal to one period $t$ of the transmission clock. For the relative distortion $i$, the ratio between this distortion $t$ and the duration $m$ of one bit there applies:

$$i = t/m = r.$$

If the asynchronous data signal is to be recovered with a relative distortion of, for example, 5 percent, the efficiency is also only 5 percent. The simplicity of this process is thus accompanied by a very low efficiency.

An object of the invention is to provide a system for synchronous data transmission through a digital transmission channel of the type described in the preamble in which simplicity of structure is accompanied by both a high efficiency and a low relative distortion in the recovered data signal.

The system according to the invention is characterized in that the transmitting terminal is provided with a sample - and - hold circuit for sampling data signals from the data terminal at the transmission clock rate to form a digital signal for this transmission channel, the receiving terminal being provided with a data clock regenerator comprising a transition detector to produce short pulses at transitions in the received digital signal, a local data clock generator having a phase synchronization circuit, means to apply the pulses from the transition detector to the synchronization circuit for synchronizing one type of transition in the local data clock with the mean phase position of the transitions in the received digital signal, the receiving terminal being furthermore provided with a sample-and-hold circuit for sampling the received digital signal at instants coinciding with the other type of transistions in the local data clock to recover data signals from the received digital signal for delivery to the data terminal.

The use of the steps according to the invention yields a very simple system for synchronous data transmission through a digital transmission channel in which efficiencies of more than 50% can be achieved with substantially negligible relative distortions. The system according to the invention thus combines the advantages of the two types of known systems without, however, having their drawbacks.

The invention and its advantages will now be described in detail with reference to the Figures.

FIG. 4 shows a table of the results achieved with the system according to the invention.

Figure 1:
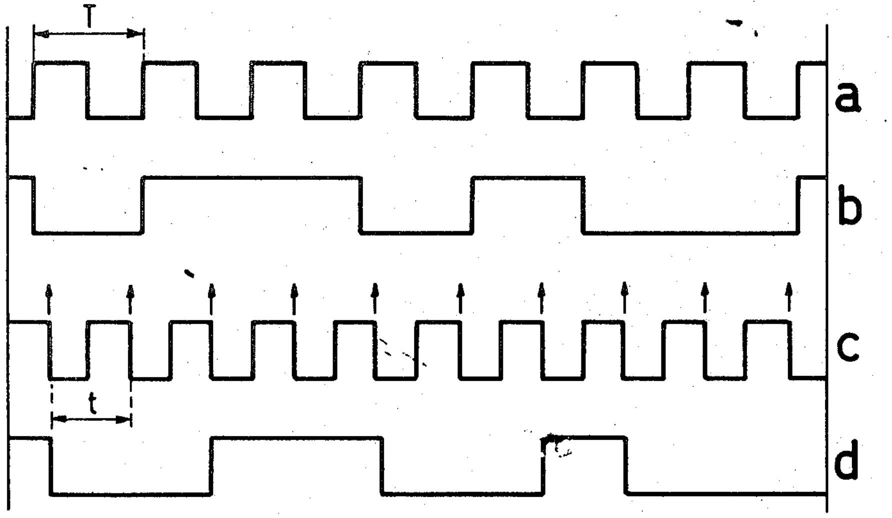
FIGS. 1 and 2 show some time diagrams to explain the operation of the system according to the invention, namely FIG. 1 for the transmitting terminal and FIG. 2 for the receiving terminal.

In FIG. 1 the time diagram *a* shows the data clock signal having a frequency of 1/T which determines the data rate of the synchronous data signals to be transmitted. The time diagram *b* shows an example of a series of data bits to be transmitted in which each bit of this series has a duration of T. The time diagram *c* shows the transmission clock signal having a frequency of 1/T which determines the transmission rate of the digital signals in the synchronous digital transmission channel.

The ratio between the frequency of the transmission clock and the frequency of the data clock is larger than 1 (and hence the ratio $t$/T between their periods is less than 1). The data clock and the transmission clock are independent of each other, i.e. there is no frequency and phase relationship between these clocks.

In the system according to the invention the digital signal to be transmitted is obtained at the transmitting terminal of the transmission channel by sampling the data signal shown in time diagram *b* of FIG. 1 with a frequency which is equal to that of the transmission clock. The sampling instants are shown in time diagram *c* by arrows facing the trailing edges of the transmission clock signal. The time diagram *d* shows the digital signal transmitted through the channel which signal also occurs at the receiving terminal of the channel. It is clear that this received digital signal *d* is greatly distorted relative to the original data signal *b*. It is, however, also clear that the data signal is transmitted with an efficiency $t$/T which may be far above the value of 0.5.

At the receiving terminal of the system according to the invention, the original data signal *b* is recovered substantially without distortion from the greatly distorted received digital signal *d* by sampling the received signal with a suitable regenerated data clock as will now be described with reference to FIG. 2.

Figure 2:
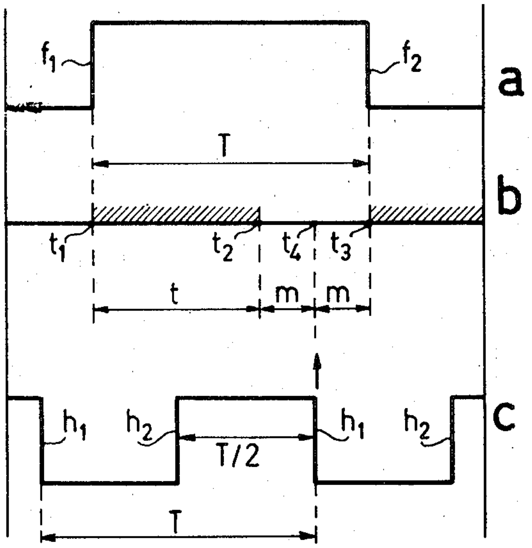

The time diagram *a* in FIG. 2 shows a bit of the data signal to be transmitted, shown in diagram *b* of FIG. 1. This bit having a duration of T is located between two transitions $f_1$, and $f_2$ which correspond to a leading edge and a trailing edge, respectively, of the data signal.

Since the frequency 1/T of the data clock and the sampling frequency $1/t$ are independent of each other transition $f_1$ of the data signal to be transmitted will be found back in the transmitted digital signal with a variable delay which corresponds to the time interval between this transition $f_1$ and the next sampling instant. This delay varies between O and t and is shown by a shaded zone in the time diagram *b* of FIG. 2, which zone extends between the instant $t_1$ corresponding to the transition $f_1$ and the instant $t_2 = t_1 + t$. This zone is referred to as the "uncertainty zone." A second uncertainty zone is represented by a second shaded zone in the time diagram *b* which commences at the instant $t_3$ of the next transition $f_2$ in the data signal, which second uncertainty zone corresponds to the variable delay with which the transition $f_2$ of the data signal to be transmitted will be found back in the transmitted digital signal.

Since $t$ is smaller than T, there corresponds to each data bit as shown in time diagram *a* a zone in the transmitted digital signal which is referred to as "certainty zone" and which is represented by the nonshaded zone in time diagram *b*. This certainty zone has its boundaries at the end of the first uncertainty zone (instant $t_2$) which follows the commencement of the data bit (transition $f_1$) and the commencement of the second uncertainty zone (instant $t_3$) which follows the end of the data bit (transition $f_2$). The duration of this certainty zone is equal to T—$t$. The certainty zones succeed each other with a rhythm 1/T.

It is evident that it is possible to interpret the greatly distorted received digital signal at the receiving terminal without any error if this signal is always sampled at instants which are located within the certainty zones. This implies that a local data clock as shown in time diagram *c* of FIG. 2 must be available at the receiving terminal of the digital transmission channel. This local data clock must have a period T and a phase such that one type of transitions in this data clock (for example, the trailing edges $h_1$ in the data clock of time diagram *c*) always substantially coincides with the center of the certainty zones. The sampling of the received digital signal which is associated with the data bit of the time diagram *a* is thus to be effected at the instant $t_4$ which exactly corresponds to the center of the certainty zone ($t_2$, $t_3$) in time diagram *b;* in time diagram *c* this sampling instant is represented by the arrow facing the trailing edge $h_1$ at instant $t_4$. The problem of optimum recovery of the data signal thus resolves itself into the problem of obtaining such a local data clock.

If the trailing edge $h_1$ of the local data clock in time diagram *c* of FIG. 2 accurately coincides with the center $t_4$ of the certainty zone ($t_2$, $t_3$) in time diagram *b*, it is found from FIG. 2 that this trailing edge $h_1$ is delayed over a period:

$$t + m = t + (T - t)/2.$$

relative to the transition $f_1$ of the data bit of the time diagram *a*. The preceding leading edge $h_2$ is then delayed over a period $$t + m - T/2 = t/2.$$

relative to the same transition $f_1$. The leading edge $h_2$ of the desired local data clock thus coincides with the center of the uncertainty zone ($t_1$, $t_2$).

Such a local data clock is obtained in a very simple manner in the system according to the invention in that the receiving terminal of the digital transmission channel is provided with a data clock regenerator including a transition detector for generating short pulses at the transitions in the received digital signal and also including a local data clock generator having a phase synchronizing circuit to which the pulses from the transition detector are applied for synchronization of one type of transitions in the local data clock (in FIG. 2 the leading edges $h_2$) with the mean phase position of the transitions in the received digital signal (in FIG. 2 this mean phase position corresponds to the center of the uncertainty zones). By sampling the greatly distorted received digital signal at instants which coincide with the other type of transitions in the local data clock (in FIG. 2 the trailing edges $h_1$) the original data signal is recovered substantially without distortion from this greatly distorted received digital signal. By using the described steps according to the invention sampling at the receiving terminal is then in fact effected exactly in the middle of the time intervals during which the data signals to be transmitted and the transmitted digital signal of the transmission channel are certain to be equal to each other (in FIG. 2 the center of the certainty zones).

Figure 3:
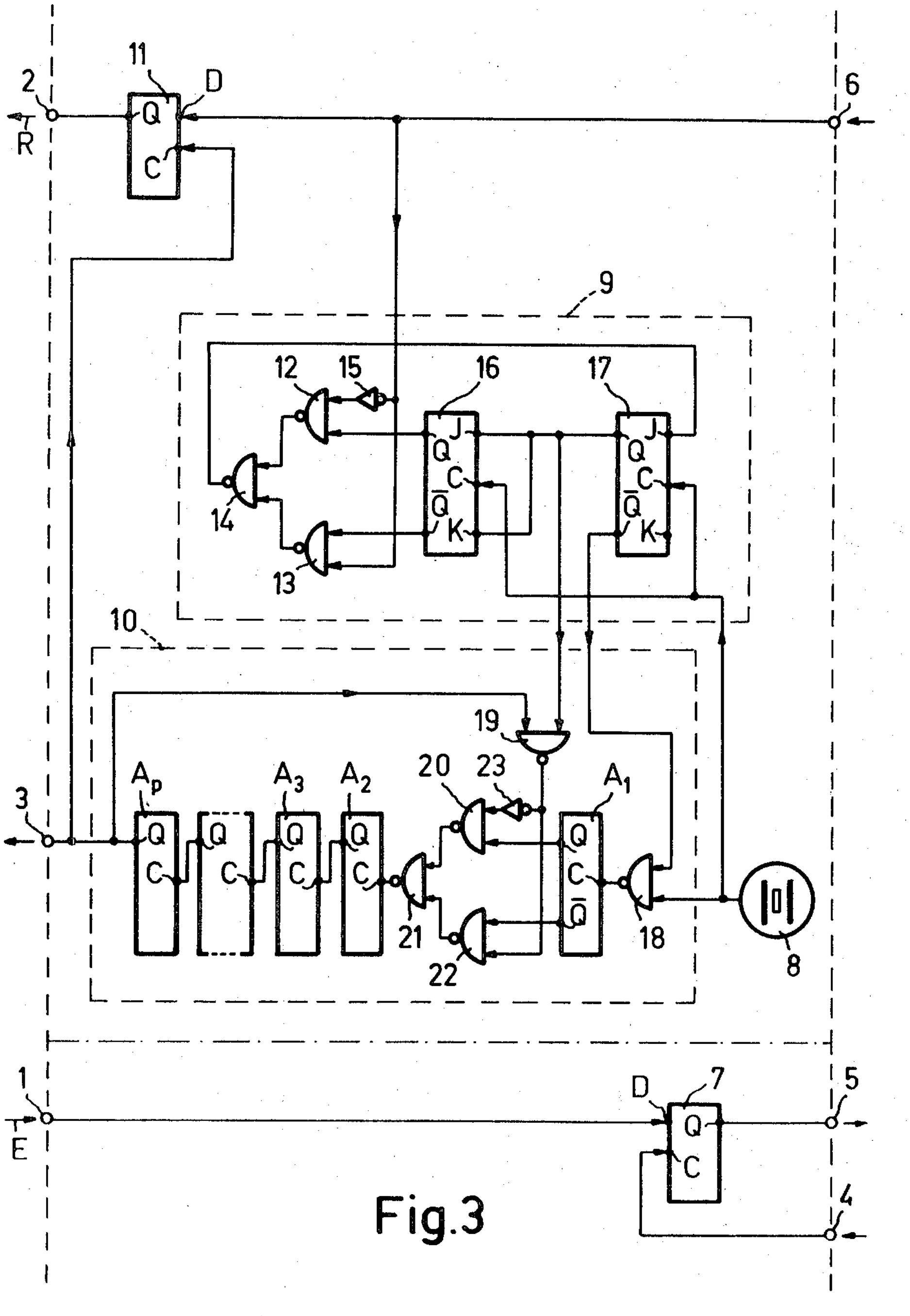
FIG. 3 shows an embodiment of the required equipment in a system according to the invention arranged for simultaneous data transmission into two directions.

FIG. 3 shows an embodiment of the required equipment in a system according to the invention which is arranged for synchronous data transmission into two directions. In such a system the two data terminals may supply data signals to and may derive data signals from the digital transmission channel. For the sake of simplicity FIG. 3 does not show the data terminals and the digital transmission channel for bidirectional transmission but only the coupling equipment for coupling one data terminal with this digital transmission channel is shown.

At the data terminal side, the coupling equipment in FIG. 3 has an input 1 for applying the synchronous data signal E to be transmitted having a data clock rate of 1/T, an output 2 for deriving the recovered transmitted data signal R and an output 3 for deriving the associated data clock.

At the transmission channel side, the coupling equipment in FIG. 3 has an input 4 for applying the transmission clock having a frequency of $1/t$, an output 5 for deriving the digital signal to be transmitted and an input 6 for applying the transmitted digital signal.

In order to obtain the digital signal to be transmitted, the data signal E from input 1 is applied to a sample-and-hold circuit 7 in the form of a bistable trigger of the D-type, and this to the preparatory input D. The transmission clock from input 4 is applied to the clock input C of trigger 7 while the digital signal obtained by sampling this data signal E with the transmission clock is derived from the output Q of trigger 7 and is applied to output 5.

In FIG. 3 the received digital signal from input 6 is applied to a data clock regenerator. This data clock regenerator includes a transition detector 9 for detecting transitions in the received digital signal and a local data clock generator including a phase synchronization circuit for synchronization of one type of transitions in the local data clock with the mean phase position of the transitions in the received digital signal. The local data clock generator includes a stable local oscillator 8 and a circuit 10 connected thereto for obtaining the local data clock with a frequency of 1/T and with the correct phase. Furthermore the received digital signal is applied to a sample-and-hold circuit 11 by which the transmitted data signal is recovered from the received digital signal while using the regenerated data clock at the output of circuit 10.

Since the frequency stability of the local oscillator must be high (at least $10^{-4}$ as will be evident from the table of FIG. 4) a crystal stabilized oscillator is used. Oscillator 8 produces rectangular pulses having a frequency which is $n$ times higher than the frequency 1/T of the data clock. The value of $n$ depends, inter alia, on the desired accuracy for the phase synchronization of the local data clock; $n$ is, for example, 256, 512 or 1024.

The transition detector 9 detects the transitions in the received digital signal at input 6 and at each detected transition it generates a pulse having a duration which is equal to one period of the pulses provided by local oscillator 8. The short pulses generated by transition detector 9 are in phase with the pulses from local oscillator 8.

To this end transition detector 9 includes an EXCLUSIVE-OR circuit which is constituted by three NAND-gates 12, 13, 14 and an inverter 15. The received digital signal at input 6 is applied to a first input of NAND-gate 13 and its complement obtained by means of inverter 15 is applied to a first input of NAND-gate 12. The two second inputs of NAND-gates 12 and 13 are connected to the outputs Q and $\overline{Q}$, respectively, of a bistable trigger 16 of the JK-type, while the outputs of NAND-gates 12, 13 are connected to the inputs of NAND-gate 14. The output of NAND-gate 14 is connected to the J-input of a bistable trigger 17 of the JK-type whose Q-output is connected to the J-input and the K-input of trigger 16. The clock inputs C of triggers 16 and 17 are connected to local osclllator 8. It will hereinafter be assumed that the two triggers 16, 17 change their state upon a trailing edge of the signal applied to their C-input. The pulses generated in response to a detected transition occur at the outputs Q and $\overline{Q}$ of trigger 17.

The operation of transition detector 9 is as follows. As will be described hereinafter the state of triggers 16 follows the state of the received digital signal with a delay of between one and two periods of the pulses from local oscillator 8. Under these circumstances any change of state in the received digital signal, hence any transition, produces a binary value "1" at the output of NAND-gate 14, and trigger 17 takes over this state "1" at the first trailing edge of the signal from oscillator 8 which follows the detected transition. At the subsequent trailing edge of the oscillator signal trigger 17 resumes the state "0" so that a pulse appears at its outputs Q and $\overline{Q}$ which pulse indicates the occurrence of a transition in the received digital signal; this pulse is in phase with the pulses from local oscillator 8 and has a duration which is equal to one period of the oscillator pulses. Simultaneously trigger 16 assumes the state which corresponds to the new state of the received digital signal so that a change of state of trigger 16 is effected after a time of between one and two periods of the oscillator pulses.

The circuit 10 for obtaining the local data clock includes a binary counter operating as a frequency divider and having $p$ stages in the form of bistable triggers $A_1, A_2, A_3, \ldots . A_p$. In this case $p$ is chosen to be such that $2^p = n$, in which $n$ is the previously mentioned ratio between oscillator frequency and data clock frequency 1/T. Furthermore circuit 10 includes two NAND-gates 18, 19 as well as an EXCLUSIVE-OR circuit which is constituted by three NAND-gates 20, 21, 22 and an inverter 23, said elements 18–23 in cooperation with bistable trigger $A_1$ serving for the phase synchronization of one type of transitions in the local data clock at the output of circuit 10 with the mean phase position of the transitions in the received digital signal.

The pulses from local oscillator 8 are applied to the clock input C of the first trigger $A_1$ in the binary counter through NAND-gate 18 which can be blocked by a pulse at output $\overline{Q}$ of trigger 17. The output Q of the last trigger $A_p$ in the binary counter is connected to an input of NAND-gate 19 which can be blocked by a pulse at output Q of trigger 17. The clock input C of the second trigger $A_2$ in the binary counter is connected to either output Q of trigger $A_1$ through NAND-gates 20, 21, or to output $\overline{Q}$ of trigger $A_1$ through NAND-gates 22, 21. The connection path is determined by the output signal from NAND-gate 19 which is directly applied to NAND-gate 22 and whose complementary form is applied to NAND-gate 20 through inverter 23.

The operation of circuit 10 is as follows. In the absence of transitions in the received digital signal trigger 17 of transition detector 9 is in the state "0" and consequently NAND-gate 19 is blocked and NAND-gate 18 is enabled. This NAND-gate 18 thus passes the pulses from oscillator 8 to the clock input C of trigger $A_1$. Since NAND-gate 19 is blocked, NAND-gate 20 is also blocked, but NAND-gate 22 is enabled so that the output $\overline{Q}$ of trigger $A_1$ is connected to the clock input C of trigger $A_2$. A symmetrical rectangular signal is then obtained at the output Q of the last trigger $A_p$ in the binary counter and this signal has a frequency which is substantially equal to that of the data clock.

For each transition in the received digital signal indicated by a pulse at output Q of trigger 17 in transition detector 9, the phase of the local data clock signal at the output Q of trigger $A_p$ is varied by an amount whose absolute value is equal to $2\pi/n$ and whose direction depends on the phase position of the transition in the received digital signal relative to a given type of transition in the local data clock signal. In circuit 10 the direction of this phase correction is determined by comparing the phase position of the transition in the digital signal by means of NAND-gate 19 with the phase position of the trailing edge in the local data clock signal at the output of circuit 10.

If the transistion occurs at a binary value of "0" of the local data clock, hence after a trailing edge, NAND-gate 19 is blocked. As a result the pulse which indicates the transition and which occurs at output Q of trigger 17 cannot reach the second trigger $A_2$ in the binary counter. Since NAND-gate 18 is likewise blocked by the pulse at output $\overline{Q}$ of trigger 17 during one period of the oscillator pulses, one pulse is eliminated from the series of pulses applied by oscillator 8 to the binary counter. The phase correction of the local data clock at output Q of the last trigger $A_p$ in the binary counter therefore consists in this case in retarding the phase by a time interval $T/n$ in which T is the period of the local data clock and $n = 2^p$ with $p$ being the number of stages of the binary counter.

If the transition occurs at a binary value of "1" of the local data clock, hence after a leading edge, NAND-gate 18 is also blocked in this case during one period of the oscillator pulses by the pulse at output $\overline{Q}$ of trigger 17 so that also in this case one pulse is eliminated from the series of oscillator pulses applied to the binary counter. In this case NAND-gate 19 is, however, enabled so that the pulse indicating the transition and occurring at output Q of trigger 17 can reach the second trigger $A_2$ in the binary counter through the EXCLUSIVE-OR-circuit 20–23. This additional pulse at clock input C of the second trigger $A_2$ is equivalent to two additional pulses at clock input C of the first trigger $A_1$. Since one pulse is eliminated by the blocking of NAND-gate 18, the final result is equivalent to the addition of one extra pulse to the series of oscillator pulses applied to the binary counter. The phase correction of the local data clock at output Q of the last trigger $A_p$ in the binary counter therefore consists in this case in advancing the phase by a time interval $T/n$.

Thus, these phase corrections performed during each transition in the received digital signal lead to a local data clock one type of transitions of which, for example, the trailing edges, is synchronized with the mean phase position of the transitions in the received digital signal.

The data clock thus regenerated is applied in the coupling equipment of FIG. 3 to output 3 and is also used for controlling sample-and-hold circuit 11. This sample-and-hold circuit 11 also has the form of a bistable trigger of the D-type. The received digital signal derived from input 6 is applied to the preparatory input D and the regenerated data clock signal at the output of circuit 10 is applied to the clock input C, the received digital signal being sampled at instants which coincide with the other type of transitions in the local data clock, in this case the leading edges. As has been described with reference to FIG. 2, the received digital signal is then sampled in the center of the certainty zones. The data signal R thus regenerated is derived from the output Q of trigger 11 and is applied to output 2.

The embodiment of FIG. 3 shows that the equipment required for the system according to the invention can be entirely formed in digital techniques. In addition this equipment is very simple in structure and is quite suitable for large-scale integration.

In addition to the mentioned advantages of a high efficiency accompanied by a low relative distortion, the system according to the invention provides the important advantage of a great extent of flexibility in the choice of the different parameters. For example, it is possible to modify the transmission rate of the digital transmission channel without modifying anything in the coupling equipment of FIG. 3. Furthermore the adaptation to the different data rates can be established in a very simple manner by replacing the crystal of the local oscillator. The only condition to be taken into account for these modifications of transmission rate and data rate is that the frequency of the data clock must always be lower than that of the transmission clock. It is true that these modifications may yield different values of efficiency and required accuracy of the local oscillator frequency as will be further described with reference to the table in FIG. 4. A further advantage of the equipment described with reference of FIG. 3 is that it may be used both for synchronous data signals but in principle also for asynchronous data signals.

With respect to the data clock regenerator used in the described system it is to be noted that the invention is not limited to the data clock regenerator shown in FIG. 3, but many modifications of this data clock regenerator are possible, and that other known data clock regenerators may be used within the scope of the present invention provided that they are arranged for synchronizing the data clock with the mean phase position of the transitions in the received digital signal.

The table in FIG. 4 shows the results obtained by using the steps according to the invention. This table shows the probability $P_d$ of the transmitted digital signal being sampled beyond the certainty zones and the error probability per data bit $P_e$ derived from $P_d$. The values of $P_d$ and $P_e$ given in the table are calculated as a function of the following three parameters:

i. The ratio ($t$/T) which is stated in the first column and which is equal to the efficiency $r = t/T$ in which $t$ is the period of the transmission clock and T is the period of the data clock;
ii. The number $n$ which is stated in the second column and which is equal to the ratio between the frequency of the local oscillator and the frequency of the data clock. As has already been described, $n$ is also equal to the number of mutually equal phase corrections in one and the same direction which is necessary to modify the phase of the local data clock over 360°;

iii. The natural frequency stability P of the local data clock, that is to say, the frequency stability of this data clock if no phase corrections are used. It has been assumed that the frequency stability of the data clock of the data signals to be transmitted is also equal to P. Whenever $P_d$ or $P_e$ is less than $10^{-8}$ this is indicated by the symbol $\epsilon$ in the table.

The table of FIG. 4 shows that the error probability per data bit, $P_e$, is always very small. For example, for an efficiency $r = (t/T) = 62$ percent and a frequency stability of the data clocks $P = 10^{-4}$, which stability can easily be obtained in crystal-stabilized oscillators, values of $P_e$ of less than $10^{-8}$ are achieved for each of the given values of $n$, the number of phase corrections required for a phase variation of 360°. In this case the error probabilities per data bit are substantially negligible. For the higher efficiency $r = (t/T) = 86$ %, at which the certainty zones are much narrower, a value of $P_e$ of less than $10^{-8}$ can likewise be achieved by using more stable data clocks ($P = 10^{-6}$) and a larger number of phase corrections for a phase variation of 360°($n$ = 1024).

What is claimed is:

1. A coupling device for a synchronous data transmission system of the type having a first data terminal sending binary data signals synchronized with a data clock frequency through a transmission channel that transmits the data synchronized with a transmission clock frequency higher than the data frequency and independent of the frequency and phase of the date clock frequency to a further data terminal, the coupling device comprising a first sample-and-hold circuit for sampling data signals from said first data terminal at said transmission clock rate to form a digital signal for said transmission channel; a data clock regenerator comprising a transition detector means for producing short pulses at each transition in a received digital signal from the transmission channel, a local data clock generator having a phase synchronization circuit, means for applying said pulses from said transition detector to said synchronization circuit for synchronizing a predetermined first type of transition in said local data clock with the mean phase position of both types of transitions in said received data signal; and a further sample-and-hold circuit connected to the data clock regenerator for sampling said received data signals at instants coinciding with the other type of transition in said local data clock whereby data signals are recovered from said received digital signal for delivery to said further data terminal.

* * * * *

PO-1050
(5/69)

UNITED STATES PATENT OFFICE
CERTIFICATE OF CORRECTION

Patent No. 3,819,853 Dated June 25, 1974

Inventor(s) MICHEL GUY PIERRE STEIN

It is certified that error appears in the above-identified patent and that said Letters Patent are hereby corrected as shown below:

IN THE CLAIMS

Claim 1, line 7, "date" should be --data--;

Signed and sealed this 10th day of December 1974.

(SEAL)
Attest:

McCOY M. GIBSON JR.
Attesting Officer

C. MARSHALL DANN
Commissioner of Patents